2,791,619

LEAD ALLOY FOR ACCUMULATOR GRID

Klaus Clostermann, Hagen, Westphalia, and Heinz Borchers, Munich, Germany, assignors to Accumulatorenfabrik Aktiengesellschaft, Frankfurt am Main, Germany No Drawing. Application November 22, 1955, Serial No. 548,654

2 Claims. (Cl. 136—65)

The invention relates to a lead accumulator battery with grid plates having positive grids consisting of a hard lead alloy to which, in addition to antimony, arsensic and copper are added as active ingredients.

Attempts have already been made to improve the known lead antimony alloy, containing 5–11% by weight of antimony, in order to increase its corrosion resistance, by adding arsenic to the alloy. A comparatively large amount of arsenic was necessary for attaining the desired object. Thus, U. S. Patent No. 2,678,341 describes a lead-antimony-arsenic alloy containing 0.2–25% of As with 4½–12½% Sb.

It has also been suggested to reduce the addition of arsenic to the range of 0.15–1% by adding silver.

The known alloys have the disadvantage that they contain arsenic in an amount which is undesirable in the manufacture of accumulators.

The present invention is based on the discovery that in an alloy containing lead-antimony-arsenic the content in arsenic can be decreased by adding copper, said addition amounting to about 0.04–0.12% Cu by weight. An arsenic content of 0.075%–0.1% will then be sufficient. Photomicrographs show that in this alloy the lead-antimony eutectic is so enclosed in the main mass of lead that anodic corrosion in the accumulator cell can be substantially avoided. Comparison tests in the cell have shown that the useful life of a grid made of the above described alloy is extended by 75% as compared to a lead-antimony alloy containing 8% antimony. When arsenic is used in the same amount, without addition of copper, the life is only increased by 47% as compared to a conventional Pb—Sb alloy. It has been found that in the alloy according to the present invention antimony need not be present in an amount higher than 8% by weight and should preferably not be used in an amount lower than 5%.

In the tests, no harmful effect to the negative electrode has been detected by the use of copper. Subsequent testing of the positive grid and the electrolyte has likewise shown that the copper remains in the positive grid.

What we claim is:

1. A grid plate for an accumulator battery consisting of a lead-antimony alloy consisting of 5–8% of antimony, 0.075%–0.1% of arsenic, 0.05–0.12% of copper and the balance of lead.

2. A grid for the positive plate of an accumulator battery consisting of a lead-antimony alloy consisting of 5–8% of antimony, 0.075–0.1% of arsenic, 0.04–0.12% of copper and the balance of lead.

References Cited in the file of this patent

UNITED STATES PATENTS

| 480,266 | Knowles | Aug. 9, 1892 |
| 1,158,674 | Frary et al. | Nov. 2, 1915 |
| 1,807,788 | Kemp | June 2, 1931 |
| 2,252,104 | Walde | Aug. 12, 1941 |
| 2,678,341 | Stoertz | May 11, 1954 |

FOREIGN PATENTS

| 309,629 | Great Britain | Apr. 15, 1929 |